(12) United States Patent
Pohl et al.

(10) Patent No.: US 8,267,328 B2
(45) Date of Patent: Sep. 18, 2012

(54) ELECTRONICALLY CONTROLLED FITTING

(76) Inventors: Achim Pohl, Seeheim-Jugenheim (DE); Tomas Fiegl, Darmstadt (DE)

( * ) Notice: Subject to any disclaimer, the term of this patent is extended or adjusted under 35 U.S.C. 154(b) by 711 days.

(21) Appl. No.: 12/436,333

(22) Filed: May 6, 2009

(65) Prior Publication Data
US 2009/0277508 A1    Nov. 12, 2009

(30) Foreign Application Priority Data
May 9, 2008   (DE) ............ 20 2008 006 405 U

(51) Int. Cl.
G05D 23/13 (2006.01)
E03B 1/00 (2006.01)
(52) U.S. Cl. .................... 236/12.12; 137/607
(58) Field of Classification Search ........... 236/12.12; 127/88, 607, 801, 884
See application file for complete search history.

(56) References Cited

U.S. PATENT DOCUMENTS

| | | | |
|---|---|---|---|
| 5,170,361 A * | 12/1992 | Reed ............... | 700/283 |
| 6,438,770 B1 | 8/2002 | Hed et al. | |
| 2007/0246550 A1 * | 10/2007 | Rodenbeck et al. ....... | 236/12.11 |

FOREIGN PATENT DOCUMENTS

| | | |
|---|---|---|
| DE | 20019895 U1 | 3/2001 |
| DE | 10149729 C2 | 5/2003 |
| EP | 0299696 A2 | 1/1989 |
| EP | 1362960 A1 | 11/2003 |
| WO | 8909956 A1 | 10/1989 |
| WO | 2006061657 A1 | 6/2006 |
| WO | WO 2006061657 A1 * | 6/2006 |
| WO | 2007034324 A2 | 3/2007 |
| WO | WO 2007034324 A2 * | 3/2007 |
| WO | 2007124438 A2 | 11/2007 |

* cited by examiner

Primary Examiner — Chen Wen Jiang
(74) Attorney, Agent, or Firm — The Webb Law Firm

(57) ABSTRACT

The invention relates to a fitting, in particular a washstand or bathtub fitting comprising an electronic control device for controlling a mixing device or a shut-off device for closing a pipe and an operating device, which is formed by a plate which is contact-sensitive and/or which is provided with proximity switches, for operating the control device. The plate is embodied in such a manner that at least two parameters from a group comprising a temperature parameter, a dispensing parameter, a volume flow rate parameter and a time parameter can be set at the same time by means of a sweeping motion, which is executed on the surface of said plate, by means of selectively touching different areas of the surface thereof and/or by means of a contact-free motion in front of the surface thereof.

9 Claims, 5 Drawing Sheets

ELECTRONICALLY CONTROLLED FITTING

BACKGROUND OF THE INVENTION

1. Field of the Invention

The invention relates to a fitting, in particular a washstand or bathtub fitting, for dispensing water or for controlling a fluid supply, comprising an electronic control device for controlling a mixing device or a shut-off device for closing a pipe and an operating device, which is formed by a plate, which is contact-sensitive and/or which is provided with proximity switches, for operating the control device.

2. Description of the Related Art

In the sanitary and kitchen field, one-hand mixer fittings for dispensing water, by means of which the volume flow rate and the temperature of the dispensed water can be set manually at the same time, have been known for many years.

DE 101 49 729 C2 describes a function and lining element for activating manufacturer-specific activators of flush boxes in prewall installation, which encompasses an operating device, which is to be arranged facing the room on the prewall and which is in contact with an activating mechanism for flushing water. Different embodiments of the function and lining element are specified therein. Among other things, provision is made for the operating device to be embodied as a "touch-screen", that is, as a contact-sensitive screen.

DE 200 19 895 U1 proposes a washstand fitting which is provided with electrically driveable metering means for setting at least one metering parameter, in particular the flow rate of water per time unit as well as the water temperature, and with control means for activating the metering means. A device for inputting speech commands is connected to the control means, wherein the control means convert speech commands, which are input by a user via the speech input device, into electric control signals for activating the metering means so that the washstand fitting can be controlled by speech. For manually inputting metering parameters or control commands for programming the control means, provision is made for an additional input device, which is embodied as a so-called "touchscreen" and which is connected to the control means via a data line.

SUMMARY OF THE INVENTION

The present invention is based on the object of creating an electronically controlled fitting, which provides for a particularly comfortable setting of different parameters in a water network and/or in a heating system.

In particular, the present invention is based on the object of creating an electronically controlled fitting for dispensing water, which provides for a particularly comfortable setting-of the water temperature and for at least one further water parameter, in particular the water dispensing quantity per time unit.

The fitting according to the invention comprises an electronic control device for controlling a mixing device or a shut-off device for closing a pipe and an operating device, which is formed from a plate, which is contact-sensitive and/or which is provided with proximity switches, for operating the control device, wherein the plate is embodied in such a manner that at least two parameters from a group comprising a temperature parameter, a dispensing parameter, a volume flow rate parameter and a time parameter can be set at the same time by means of a sweeping motion, which is executed on the surface of said plate, by means of selectively touching different areas of the surface thereof and/or by means of a contact-free motion in front of the surface thereof.

Preferably, the fitting according to the invention is provided with a mixing device for mixing cold water and warm water, wherein the electronic control device serves the purpose of controlling the mixing device and wherein the plate of the operating device is embodied in such a manner that, in addition to a target temperature of water to be dispensed, at least a further water dispensing parameter, in particular a water quantity to be dispensed per time unit, can be set at the same time by means of a sweeping motion, which is executed on the surface of said plate, by means of selectively touching different areas of the surface thereof and/or by means of a contact-free motion in front of the surface thereof.

The invention represents a new electronic activating concept for fittings for dispensing water or for controlling a fluid supply, by means of which a plurality of parameters from the group comprising water temperature, dispensing quantity, volume flow rate and time can be set at the same time in the simplest manner.

The plate, which is contact-sensitive and/or which is provided with proximity switches, can be made of metal, plastic, ceramic, wood, derived timber products or glass, for example, and the front or back side thereof can be provided with capacitive pressure sensors. However, an embodiment of the invention where the plate of the operating device is formed from a screen, which is contact-sensitive and/or which is provided with proximity switches, is preferred. This embodiment provides for the possibility of giving an optical response relating to the current or undertaken setting, respectively, to the user of the fitting during the setting of water quantity and water temperature.

A further advantageous embodiment of the invention provides for the screen, in response to touching its surface and/or in response to a contact-free motion in front of its surface, to display a symbol, the color of which changes as a function of the set target temperature of the water. Preferably, in response to cold water, the symbol has a blue color, while it appears in red in response to warm or hot water. The user of the fitting according to the invention thus receives an easily comprehensible response relating to the current or undertaken temperature setting, respectively.

Accordingly, a further advantageous embodiment of the invention provides for the screen, in response to touching its surface and/or in response to a contact-free motion in front of its surface, to display a symbol, the size and/or form of which changes as a function of the set water dispensing quantity. For example, the symbol can encompass the shape of a circular ring, wherein the ring thickness and/or the ring diameter become larger with an increasing water dispensing quantity (flow rate).

Further preferred and advantageous embodiments of the fitting according to the invention are described in the following detailed description and the accompanying figures.

BRIEF DESCRIPTION OF THE FIGURES

The invention will be specified in more detail below by means of a drawing, which illustrates a plurality of exemplary embodiments. In schematic illustration

DETAILED DESCRIPTION OF THE INVENTION

Figure 1:
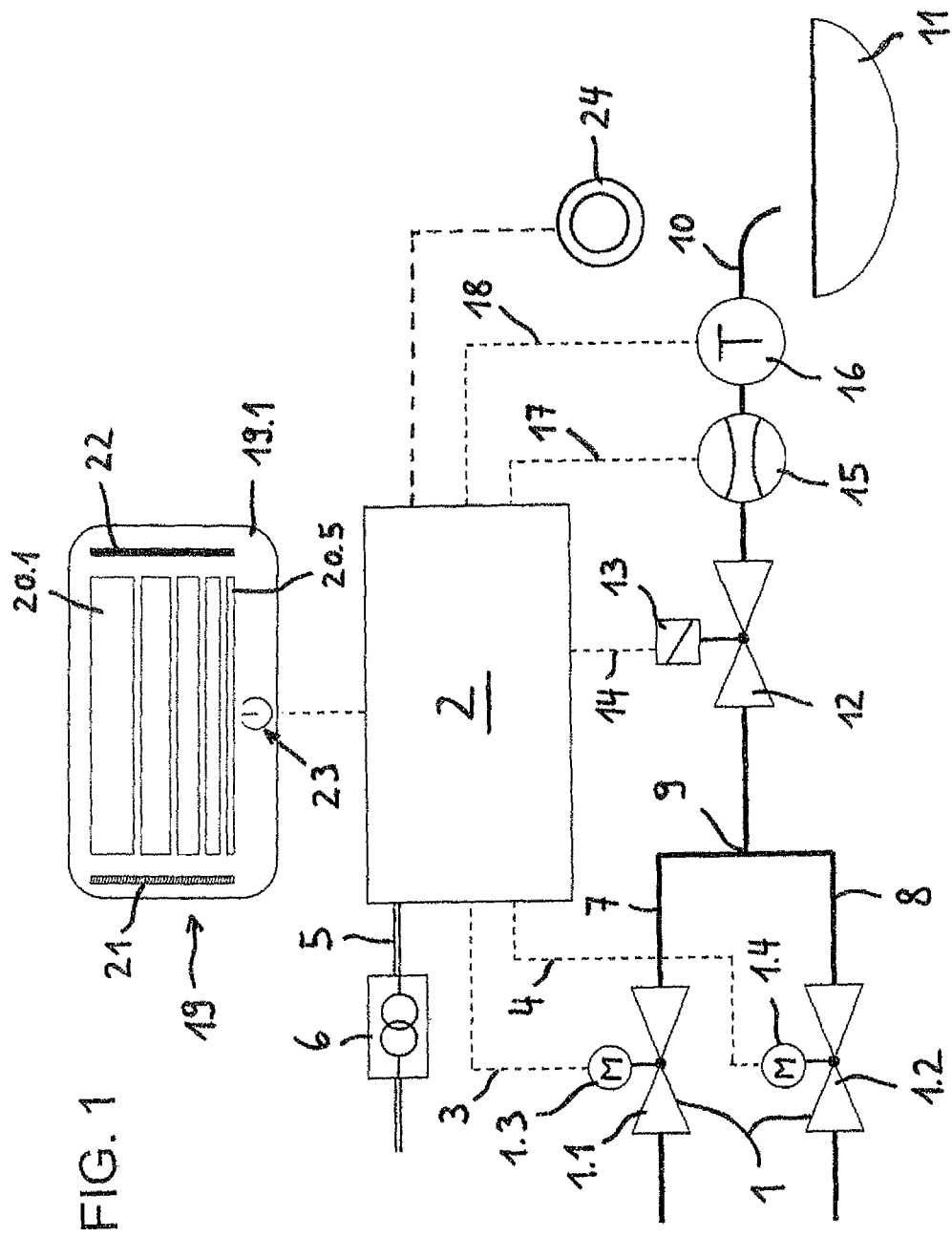
FIG. 1 shows a block diagram of a fitting according to the invention in connection with an operating device, which encompasses a contact-sensitive plate.

The fitting illustrated in FIG. 1 is an electronically controlled fitting for dispensing water, which can be used as washstand, bathtub, shower or kitchen sink fitting, for example.

The fitting is provided with a mixing device 1 for mixing cold water and warm water and with an electronic control is device 2 for controlling the mixing device.

The mixing device 1 comprises a water valve 1.1 for cold water and a water valve 1.2 for warm water. The water valves 1.1, 1.2 can in each case be opened from a shut-off position into an open position in a stepless continuous manner or can be closed vice versa in a stepless manner, respectively. They are in each case provided with an electric actuator 1.3, 1.4, for example an electric motor, which can be activated by the electronic control device 2 via a control line 3, 4.

The actuators 1.3, 1.4 as well as the control device 2 operate with low voltage. They are embodied, for example, for an operation with 9 volts. The control device 2 is connected to a 230-volt transformer 6 via a power supply line 5.

Water lines 7, 8, which are connected to a feed line 10 via a T-connector 9, are connected to the continuously settable water valves 1.1, 1.2. The feed line 10 empties above a washstand 11 or a bathtub, for example. A shut-off valve 12, which is provided with an electromagnetic actuator 13, which in turn can be controlled by the electronic control device 2 via a control line 14, is integrated in the feed line 10.

A flow rate measuring device (volume flow rate measuring device) 15 and a temperature sensor 16 for determining the water temperature are further integrated in the feed line 10. The flow rate measuring device 15 and the temperature sensor 16 are connected to the electronic control device 2 via signal lines 17, 18.

The operation of the control device 2 is executed by means of an operating device 19, which encompasses a contact-sensitive plate 19.1. It is embodied in such a manner that, in addition to a set-point temperature of the water to be dispensed, the water quantity to be dispensed per time unit can also be set at the same time by means of a manual sweeping motion, which is executed on the surface thereof.

The plate 19.1 of the operating device 19 can be formed from a metal or plastic plate, for example, which is provided with contact-sensitive fields 20.1, 20.2, 20.3, 20.4, 20.5, which are separated from one another. In the exemplary embodiment of an operating device according to the invention illustrated in FIGS. 1 and 10, the plate encompasses, on its front side, contact-sensitive fields 20.1, 20.2, 20.3, 20.4, 20.5 of different widths, wherein the width of the fields increases from bottom to top. The fields are assigned to different water dispensing quantities. By touching the narrowest field 20.5, the water quantity to be dispensed per time unit can be set to a minimal target value greater than zero. By touching a field 20.1, 20.2, 20.3, 20.4, which is comparatively wider, the water dispensing quantity (flow rate) can be set to a correspondingly higher target value. A maximum target value for the water quantity to be dispensed per time unit can be set by touching the widest field 20.1.

Different markings 21, 22, which symbolize cold or warm water, respectively, are attached at the left and right edge of the plate 19.1. In the illustrated exemplary embodiment, the left marking 21 consists of a blue line, while the right marking 22 consists of a red line, which symbolizes warm or hot water, respectively.

In the event that the widest field 20.1 is touched close to the left marking 21, for example, the control device 2 controls the actuators 1.3, 1.4 of the water valves 1.1, 1.2 in such a manner that a relatively high water quantity comprising a low water temperature is dispensed per time unit in response to an open feed line 10.

However, in the event that the narrowest field 20.5 is touched close to the right marking 22, for example—in the event that the shut-off valve 12 is open in the feed line 10—a relatively small water quantity per time unit runs into the bowl 11 or the tub, respectively, with a relatively high water temperature.

By sweeping across or touching the contact-sensitive plate 19.1 in the area of one of the fields 20.1, 20.2, 20.3, 20.4, 20.5, the water quantity to be dispensed per time unit and the water temperature can thus be set at the same time.

The contact-sensitive plate 19.1 furthermore encompasses a surface area 23, which defines an on-off switch. When touching this surface area 23, the electromagnetic actuator 13 of the shut-off valve 12 is activated so that the shut-off valve 12 opens or closes, depending on the state in which the shut-off valve 12 is at the present time.

By means of the flow rate measuring device 15 and the temperature sensor 16, the actual value of the dispensed water quantity or the actual value of the temperature of the dispensed water, respectively, is determined and is compared to the corresponding target values, which are set via the operating device 19, in the control device 2. In the event of a deviation between the actual values and the set target values, which exceeds a predetermined or predeterminable amount, the control device 2 controls the actuators 1.3, 1.4 of the water valves 1.1, 1.2 in such a manner that the deviation is reduced correspondingly and finally lies within an admissible tolerance range.

According to a preferred embodiment of the invention, provision is made for the control device 2 to activate the actuators 1.3, 1.4 of the water valves 1.1, 1.2 according to a predetermined or predeterminable standard setting in response to an opening of the shut-off valve 12 by touching the surface area (on-off switch) 23 of the operating device 19 so that the water quantity dispensed per time unit and the water temperature then correspond to this standard setting. The standard setting can predetermine an average water quantity (flow rate), which lies between the settable maximum value and the settable minimum value, and an average water temperature of approx. 20° C.

According to a further preferred embodiment, provision is made for the fitting according to the invention to be provided with a proximity switch or push-button 24 for opening the electromagnetic shut-off valve 12. In this case, the contact-sensitive surface area (on-off switch) 23 of the operating device 19 only serves the purpose of activating a setting mode, in which target values for the water temperature and for the water quantity to be dispensed per time unit can be set.

Figure 10:
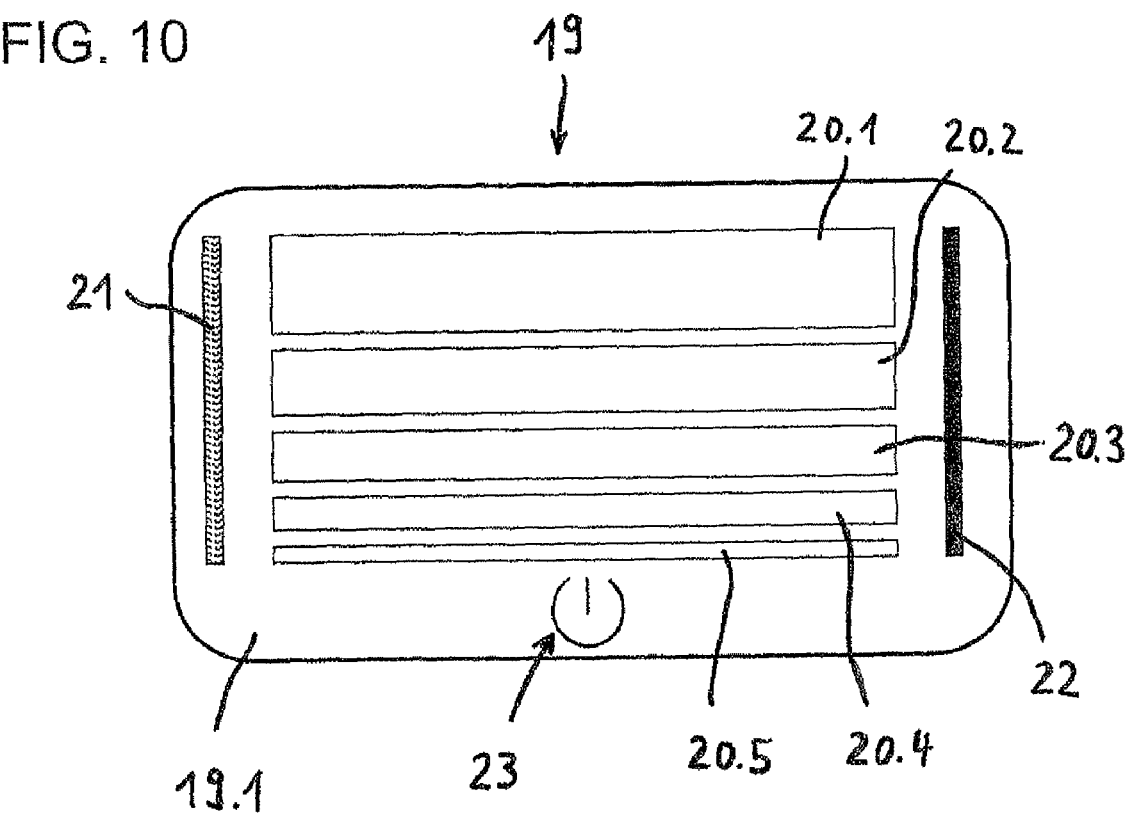
FIG. 10 shows the operating device according to FIG. 1 in an enlarged front view.

Regardless of the illustration of the operating device 19 in FIGS. 1 and 10, it also lies within the scope of the invention to embody the operating device 19 or the activating technology (electronics), respectively, arranged behind the plate 19.1 in such a manner that it provides for a stepless setting of the parameters water quantity per time unit as well as water temperature.

Figure 2:
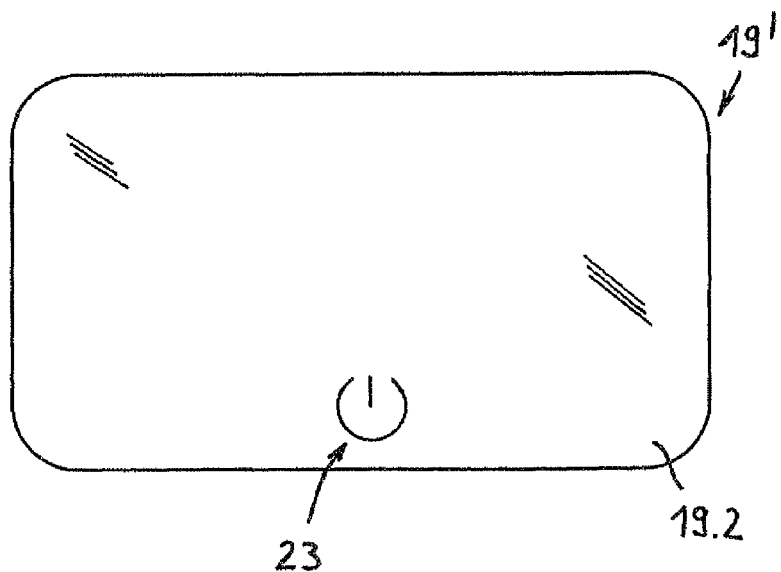
FIGS. 2 to 4 show a second exemplary embodiment of an operating device of a fitting according to the invention in front view.
Figure 3:
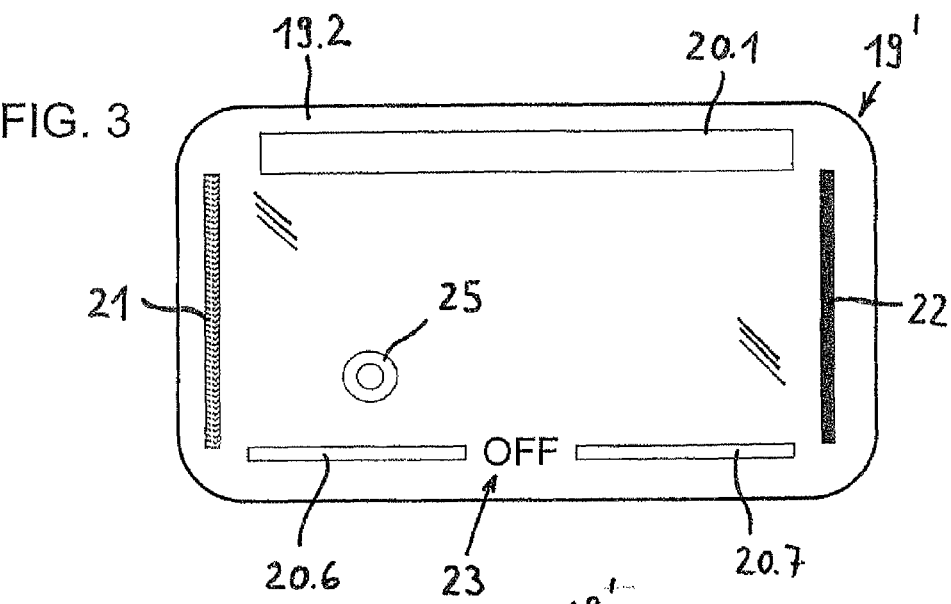
Figure 4:
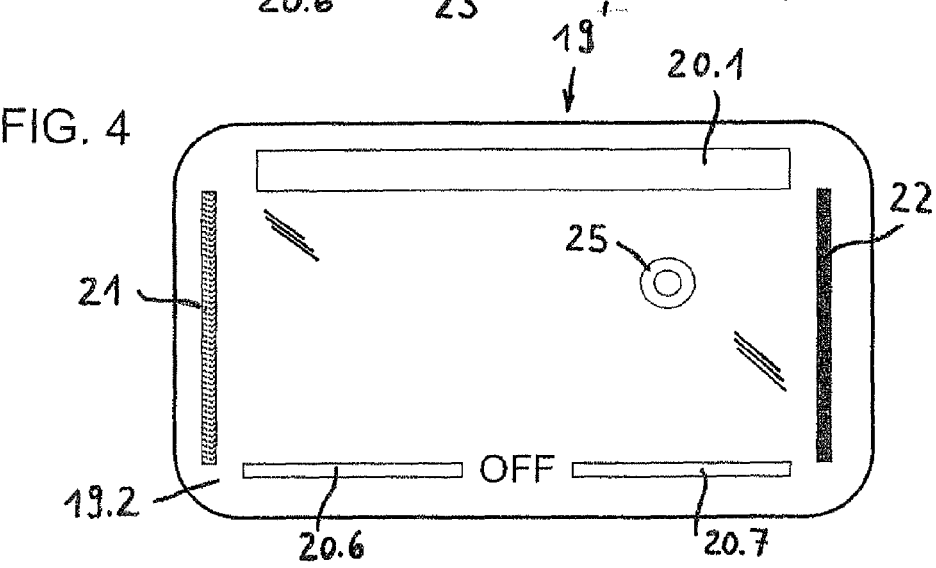
Figure 5:
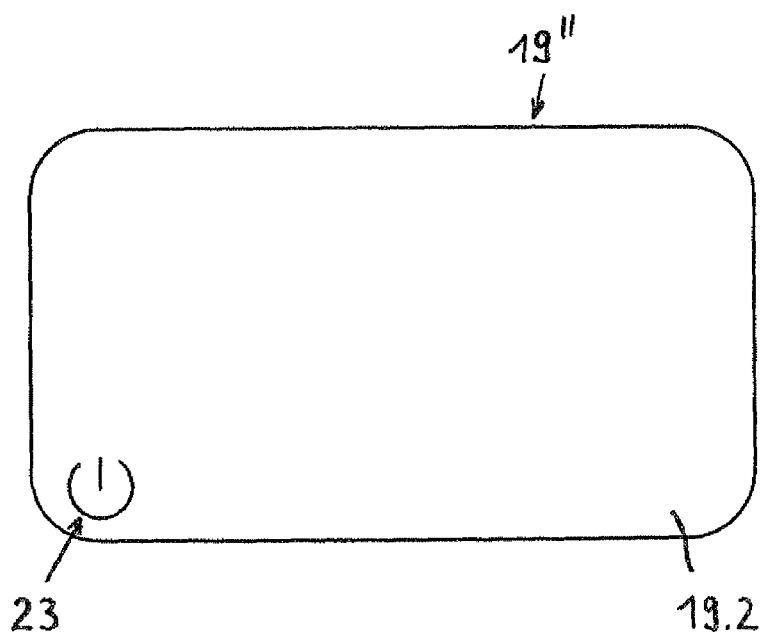
FIGS. 5 to 9 show a third exemplary embodiment of an operating device of a fitting according to the invention in a front view.

A further exemplary embodiment of an operating device 19' of a fitting according to the invention is illustrated in FIGS. 2 to 4. The fitting, which is not illustrated herein in detail comprises—as is illustrated in FIG. 1—at least one mixing device for mixing cold and warm water and an electronic control device for controlling the mixing device.

The operating device 19' illustrated in FIGS. 2 to 4 is formed from a plate-shaped, contact-sensitive screen 19.2. The screen 19.2 encompasses a contact-sensitive surface area 23, which defines an on-off switch. In FIG. 2, the operating device 19' is in a function standby mode. In this mode, the surface area 23 displays that the operating device 19' can be turned on by touching it.

The image displayed by the operating device 19' changes when the surface area 23 is touched. In the on-state, the display of the symbol "OFF" on the operating device 19' indicates that it can be switched into the standby mode by touching the surface area 23.

In the exemplary embodiment according to FIGS. 3 and 4, the screen 19.2, in the on-state, shows in addition to the "OFF" symbol, different spaced apart symbols 20.1, 20.6, 20.7, 21, 22, which define a setting area on the contact-sensitive surface of the screen 19.2 for setting a target temperature of the water to be dispensed and the water quantity to be dispensed per time unit. In addition, the height of the set water temperature as well as the height of the set water quantity are signalized in a qualitative manner and are thus confirmed to the user by means of a code marker or by means of a symbol 25, respectively. The symbol 25, which is illustrated herein in a ring-shaped manner, can also have a different form; for example, it can be designed as a light spot or circular surface.

The upper symbol 20.1 in the form of a horizontally running rectangular area symbolizes the maximally possible water quantity (volume flow rate). The two lower, relatively narrow, horizontally running rectangular areas 20.6, 20.7, symbolize a minimal water quantity. The left symbol in the form of a vertically extending rectangular surface, which is preferably displayed in blue, symbolizes cold water, while the right symbol 22, again in the form of a vertically extending rectangular area, which, however, shines in a red color, symbolizes warm water.

The user of the fitting according to the invention can now set a target temperature of the water to be dispensed and, at the same time, the water quantity to be dispensed per time unit, by touching and displacing the symbol (code marker) 25 with one of his fingers.

After the temperature and water quantity have been set, the user can switch the operating device 19' into the function standby mode according to FIG. 2 by touching the surface area 23, which displays the "Off" symbol.

The operating device 19" illustrated in FIGS. 5 to 9 is also formed by a contact-sensitive screen 19.2. The screen 19.2, in turn, encompasses a contact-sensitive surface area 23, which defines an on-off switch. In the standby mode illustrated in FIG. 5, the surface area 23 displays that the operating device 19" can be turned on by touching it.

By touching the surface area 23, the displayed image changes. The on-state is displayed in particular by means of a code marker 25. With the symbol "OFF", the operating device 19" furthermore displays that it can be switched into the standby mode by touching this surface area 23.

By touching and displacing the code marker 25 on the screen 19.2, the user of the operating device 19" can set the water quantity to be dispensed per time unit and, at the same time, the water temperature of the water to be dispensed.

The code marker 25 thereby changes its size or its surface area, respectively, as a function of the set water dispensing quantity as well as its color as a function of the set target temperature.

Figure 6:
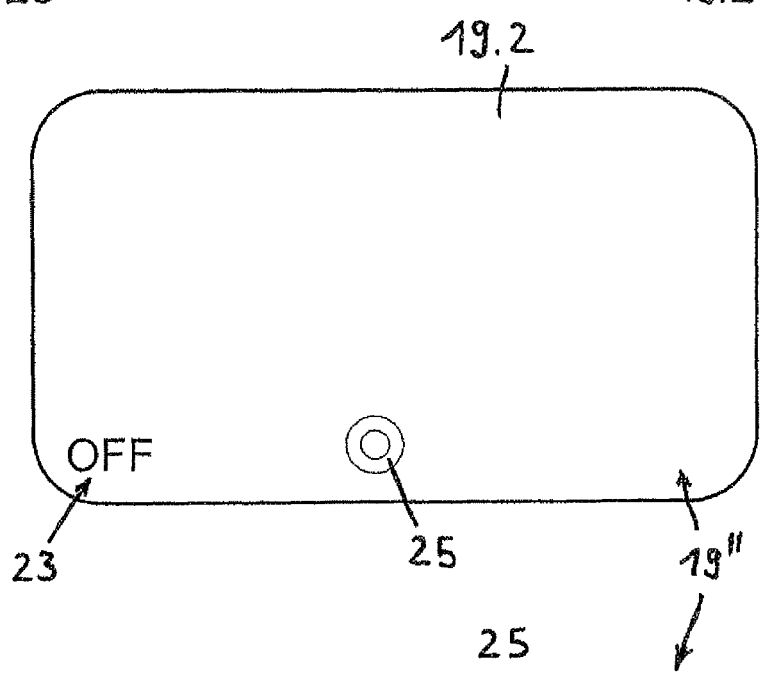
Figure 7:
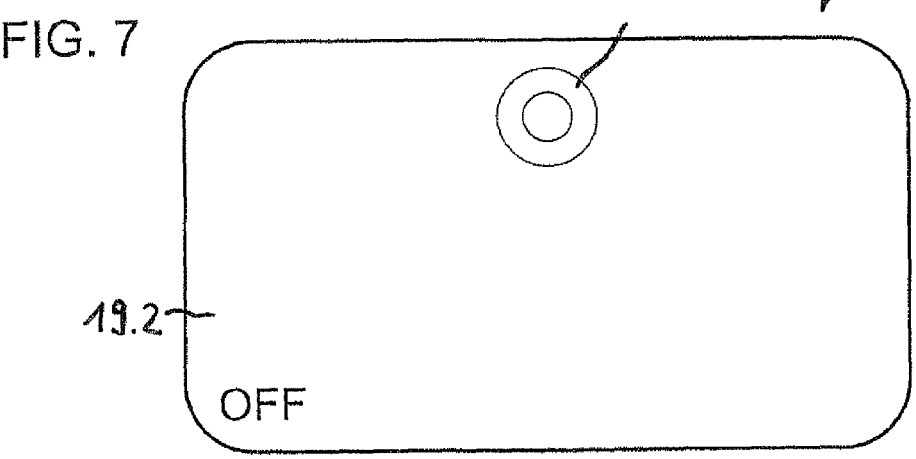

A comparison of FIGS. 6 and 7 clarifies that a user of the operating device 19" receives the optical response that he has set the water quantity to be dispensed per time unit to a higher target value in response to a displacement of the displayed code marker 25 from bottom to top by means of the accompanying size increase of the code marker 25.

Figure 8:
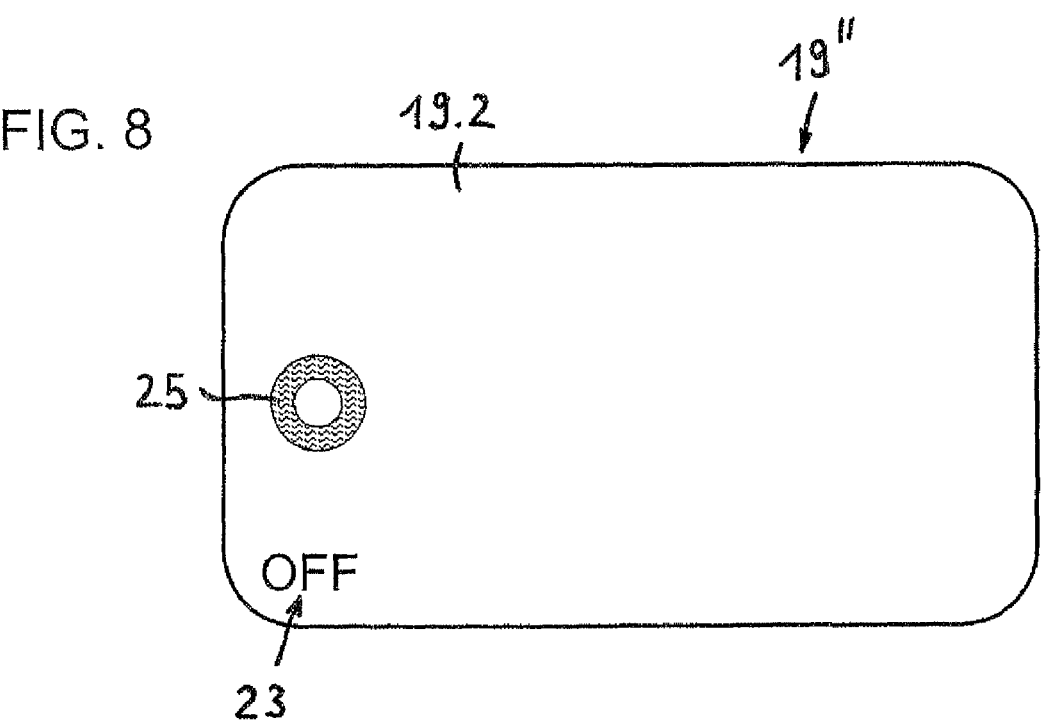
Figure 9:
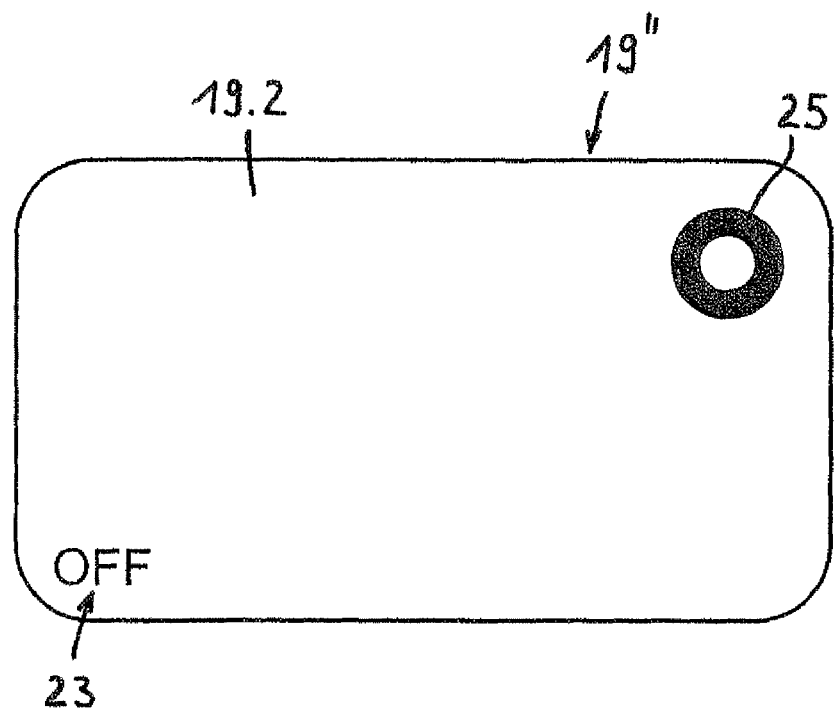

It is furthermore illustrated in FIGS. 8 and 9 that the color or the pattern, respectively, of the displayed code marker 25 changes from left to right and vice versa in response to its displacement on the screen 19.2. A temperature-water quantity setting, where the fitting according to FIG. 1 dispenses cold water with an average volume flow rate when the shut-off valve 12 is open, is outlined in FIG. 8. FIG. 9, however, illustrates a temperature-water quantity setting, where the fitting according to FIG. 1 dispenses warm or hot water with a maximum flow rate when the shut-off valve 12 is open. In the setting according to FIG. 8, the code marker 25 preferably has a blue color, while it preferably shows a red color in the setting according to FIG. 9.

The (ring-shaped) code marker 25 is thus a symbol which displays the set temperature and, at the same time, the set flow rate in a qualitative manner.

A further preferred embodiment of the invention, which is not illustrated in detail in the drawing, provides for the control device to comprise at least one storage, in which the user-related settings can be stored. In this case, the operating device comprises a key pad or a key pad, which appears on the contact-sensitive screen, respectively, via which a user can store and recall, if desired, one or a plurality of personally preferred parameter settings, in particular water temperature-water volume flow rate settings, in the storage of the control device. Personalized push-buttons or keypads, respectively, which are made visible on the screen by means of a corresponding push-button command and which can be activated or operated by touch, can thereby be assigned to the personal parameter settings.

As an alternative or additionally, the input or setting, respectively, of user-related parameters can also be executed by means of contact-free motions in front of the surface of the plate of the operating device, which is provided with proximity switches. In this case, the fitting according to the invention is thus able to detect a gesture of a user, that is, distance-oriented commands or motion patterns, respectively.

The execution of the invention is not limited to the afore-described exemplary embodiments. Instead, numerous variants are possible, which use the invention specified in the enclosed claims, even in response to a different design. Symbols 20.1, 20.2, 20.3, 20.4, 20.5, 20.6, 20.7, 21, 22, 25, for example, can thus also have a different form; for example, the code marker 25 can be designed in the form of a square. It furthermore also lies within the scope of the invention to set another parameter, for example the dispensing quantity of a fragrance in bath water in addition to the water temperature by means of the operating device of the fitting at the same time.

The execution of the invention is in particular not limited to the use of contact-sensitive plates or contact-sensitive screens, respectively, for setting water temperature and a further parameter at the same time. Instead, the invention also comprises embodiments, where the operating device of the fitting according to the invention is formed by a plate provided with proximity sensors or by a screen provided with proximity sensors, respectively, so as to set the water temperature and, at the same time, a further parameter by means of a contact-free motion in front of the plate or in front of the screen, respectively. The proximity sensors can thereby be embodied as optical and/or as capacitive proximity sensors (proximity switches), for example. The operating device of the fitting according to the invention is thus capable of detecting motions or gestures, respectively, as distance-oriented commands and motion patterns. Preferably, in this embodiment as well, the fitting is equipped with a screen, on which the distance-oriented commands and/or motion patterns are displayed.

Incidentally, the fitting according to the invention cannot only be used as washstand, bathtub or kitchen sink fitting, but also as a fitting for controlling or regulating, respectively, heaters or heating systems (e.g. floor heating).

The invention claimed is:

1. A fitting, in particular a washstand or bathtub fitting comprising an electronic control device for controlling a mixing device for mixing cold water and warm water and a plate which is contact-sensitive and/or which is provided with proximity switches, for operating the control device, wherein the plate is embodied in such a manner that, in addition to a target temperature of water to be dispensed, at least a further water dispensing parameter can be set at the same time by means of a sweeping motion, which is executed on the surface of said plate, by means of selectively touching different areas of the surface thereof and/or by means of a contact-free motion in front of the surface thereof, wherein the plate is formed by a screen, which is contact-sensitive and/or which is provided with proximity switches, and which displays a symbol when touching the surface of said screen, wherein the color of said symbol changes as a function of the set target temperature and wherein the size and/or form of said symbol changes as a function of the set water dispensing quantity by displacing the symbol on the screen.

2. The fitting according to claim 1, wherein the screen encompasses at least one surface area, which defines an on-off switch.

3. The fitting according to claim 2, wherein the surface area displays the respectively switchable state of the on-off switch.

4. The fitting according to claim 1, wherein, in the on-state, the screen displays different spaced apart symbols, which define a setting area on the contact-sensitive surface of the screen for setting a target temperature of the water to be dispensed and of the at least one further water dispensing parameter, in particular of the water quantity to be dispensed per time unit.

5. The fitting according to claim 4, wherein the symbols, which define the setting area for setting a target temperature of the water to be dispensed, encompass different colors.

6. The fitting according to claim 4, wherein the symbols, which define the setting area for setting the water quantity to be dispensed per time unit, are symbols of different sizes.

7. The fitting according to claim 1, wherein the control device is provided with a push-button or proximity switch for opening an electromagnetic shut-off valve.

8. The fitting according to claim 1, wherein the control device comprises at least one storage, in which the user-related settings can be stored, wherein the operating device comprises a key pad or a key pad appearing on a contact-sensitive screen, via which a user can store and recall, if desired, one or a plurality of personally preferred parameter settings, in particular water temperature/water volume flow rate settings, in the storage of the control device.

9. The fitting according to claim 8, wherein personalized push-buttons and/or keypads, respectively, which are made visible on the screen by means of a push-button command and which can be activated or operated by touch, can thereby be assigned to the personal parameter settings.

\* \* \* \* \*